United States Patent [19]

Rukavina

[11] Patent Number: 4,554,318
[45] Date of Patent: Nov. 19, 1985

[54] CYANOETHYLACRYLATE/ACRYLIC ACID COPOLYMER

[75] Inventor: Thomas G. Rukavina, Lower Burrell, Pa.

[73] Assignee: PPG Industries, Inc., Pittsburgh, Pa.

[21] Appl. No.: 615,191

[22] Filed: May 30, 1984

[51] Int. Cl.[4] .......................... C08L 63/00; C08F 8/00
[52] U.S. Cl. .................................... 525/118; 525/119; 525/123; 526/298
[58] Field of Search ....................... 525/118, 119, 123; 526/298

[56] References Cited

U.S. PATENT DOCUMENTS

| | | | |
|---|---|---|---|
| 3,242,036 | 3/1966 | Victorius | 526/298 |
| 3,701,758 | 10/1972 | Maska | 526/298 |
| 4,154,914 | 5/1979 | Kuraya | 526/39 |
| 4,294,939 | 10/1981 | Taniguchi et al. | 525/118 |

*Primary Examiner*—Theodore E. Pertilla
*Attorney, Agent, or Firm*—Donna L. Seidel

[57] ABSTRACT

Novel copolymers of acrylic acid and cyanoethylacrylate, and the use of such copolymers as primers for bonding metal-containing coatings to organic polymer substrates, are disclosed. The copolymers of the present invention may be linear or crosslinked, may further comprise hydroxyethylacrylate, and are preferably of low molecular weight when used in solution as a primer.

6 Claims, No Drawings

CYANOETHYLACRYLATE/ACRYLIC ACID COPOLYMER

BACKGROUND

The present invention relates generally to the art of organic polymers, and more particularly to the art of acrylate copolymers.

U.S. Pat. No. 4,154,914 to Kuraya teaches the copolymerization of an acrylic ester or esters with a malonic acid derivative having an active methylene group to produce an acrylic rubber.

SUMMARY

The present invention involves the synthesis of a novel low molecular weight cyanoethylacrylate/acrylic acid copolymer which is particularly useful as a primer to bond metal-containing thin films to organic polymer substrates. The invention further comprises a terpolymer formed from cyanoethylacrylate, acrylic acid and hydroxyethylacrylate. The terpolymer is especially effective for bonding conductive metal oxide films to acrylic substrates.

DESCRIPTION OF THE PREFERRED EMBODIMENTS

The preferred low molecular weight cyanoethylacrylate/acrylic acid copolymer of the present invention is synthesized by a free radical initiated polymerization reaction of cyanoethylacrylate and acrylic acid. A preferred free radical initiator is 2,2'-azobis(isobutyronitrile). The polymerization is preferably carried out with cyanoethylacrylate and acrylic acid in solution. Cyclohexanone is a preferred solvent, and a concentration of about 25 percent monomer solids is particularly preferred.

The polymerization reaction is preferably carried out by dissolving cyanoethylacrylate and acrylic acid at about 25 percent total solids in cyclohexanone. The ratio of monomers is preferably about 2:1 acrylic acid to cyanoethylacrylate. A very small amount, typically less than 0.1 percent, of free radical initiator is also dissolved in the solvent. As the reaction is heated to about 90° C., 2,2'-azobis(isobutyronitrile) decomposes to form two free radicals with the evolution of nitrogen. The reaction solution is preferably held at a temperature of about 90° to 100° C. for about 24 hours to form a linear oligomer reaction product of cyanoethylacrylate/acrylic acid. The polymerization reaction proceeds as follows:

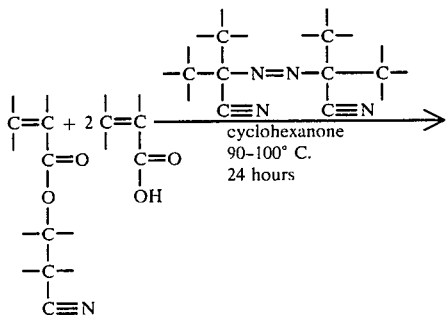

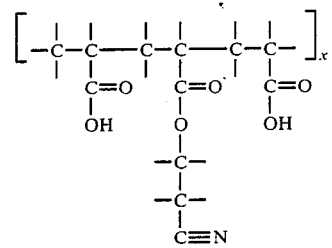

wherein x is ≧1. The cyanoethylacrylate/hydroxyethylacrylate/acrylic acid terpolymer of the present invention is formed by a similar free radical initiated polymerization reaction, preferably using cyanoethylacrylate, hydroxyethylacrylate and acrylic acid monomers in a molar ratio of about 3:5:2, respectively.

The linear polymers are preferably crosslinked for use as primers in accordance with the present invention. Crosslinking improves the peel strength adhesion, dimensional stability and weather resistance of the polymers, and may be accomplished with crosslinking agents such as diepoxides and triisocyanates. A preferred crosslinking agent is 2-(3,4-epoxycyclohexyl-5,5-spiro-3,4-epoxy)-cyclohexane-meta-dioxane, which reacts with carboxylic acid groups without a catalyst at temperatures above 150° C., and at lower temperatures in the presence of a Lewis acid. Preferably, the crosslinking is carried out at a temperature no higher than 100° C. using a catalyst; dibutyltin dilaurate is preferred. The crosslinking reaction is illustrated below.

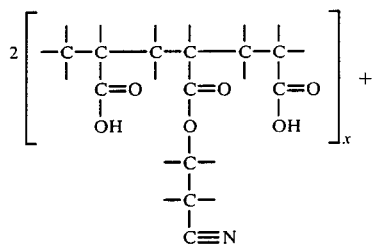

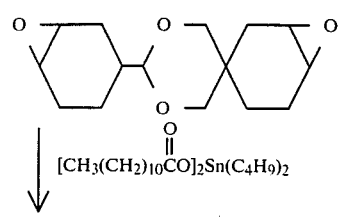

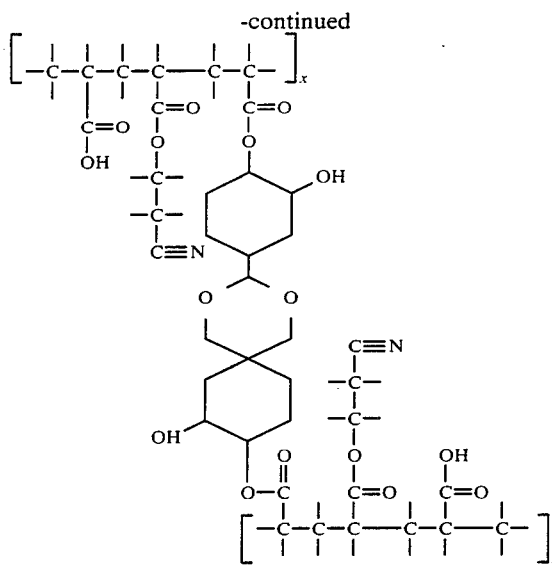

The present invention will be further understood from the descriptions of specific examples which follow.

EXAMPLE I

A cyanoethylacrylate/acrylic acid copolymer is prepared by mixing cyanoethylacrylate and acrylic acid in a molar ratio of 0.5 at a total solids concentration of 25 percent in cyclohexanone. The reaction solution also contains 0.4 percent 2,2'-azobis(isobutyronitrile) which acts as a free radical chain reaction initiator. As the reaction solution is heated, the 2,2'-azobis(isobutyronitrile) decomposes, with the evolution of nitrogen, forming two free radicals which initiate the polymerization of the cyanoethylacrylate and acrylic acid. The reaction solution is held at a temperature of 90° to 100° C. for 24 hours to form an oligomer of cyanoethylacrylate and acrylic acid having the following structure

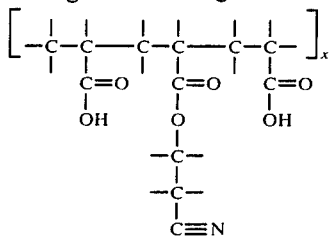

wherein x is such that the molecular weight is sufficiently low so that the oligomer remains soluble in cyclohexanone.

EXAMPLE II

The cyanoethylacrylate/acrylic acid oligomer of Example I is preferably crosslinked as follows. Dibutyltin dilaurate catalyst is dissolved at a concentratin of 0.5 percent by weight of the oligomer in a solvent comprising 50 percent by volume each of cyclohexanone and acetone. The oligomer is then dissolved in the catalyst solution, to a final concentration of 10 percent solids, and the crosslinking agent is added, 2-(3,4-epoxycyclohexyl-5,5-spiro-3,4-epoxy) cyclohexane-metadioxane available from Union Carbide as ERL-4234 cycloaliphatic epoxide.

The above examples are offered to illustrate the present invention. Various modifications such as different concentrations of reactants, other solvents, and varying reaction conditions are contemplated for producing a variety of copolymers. The ratio of acrylic acid and functional acrylate monomers may vary over a wide range; the structural formulae herein therefore represent a random segment rather than an exactly repeating unit of copolymers. When such copolymers are used as primers, substrates other than acrylic and coatings other than indium oxide are included within the scope of the present invention as defined by the following claims.

I claim:

1. A composition of matter comprising the polymerization reaction product of a cyanoethylacrylate and acrylic acid further reacted with a crosslinking agent to form a crosslinked polymer having the structural formula

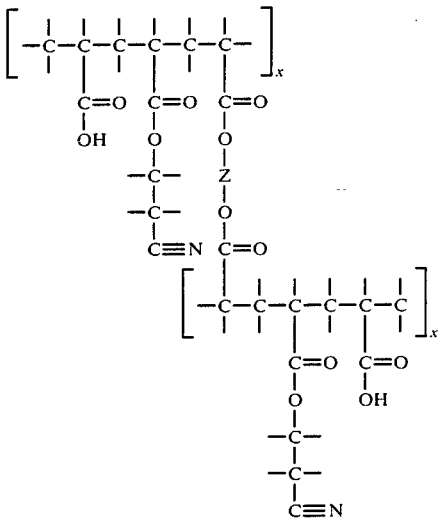

wherein Z represents the crosslinking agent and x is $\geq 1$.

2. The composition according to claim 1, wherein the crosslinking agent is selected from the group consisting of epoxides and triisocyanates.

3. The composition according to claim 2, wherein the crosslinking agent is 2-(3,4-epoxycyclohexyl-5,5-spiro-3,4-epoxy) cyclohexanemeta-dioxiane.

4. A composition of matter comprising the polymer reaction product of cyanoethylacrylate, hydroxyethylacrylate and acrylic acid having the structural formula

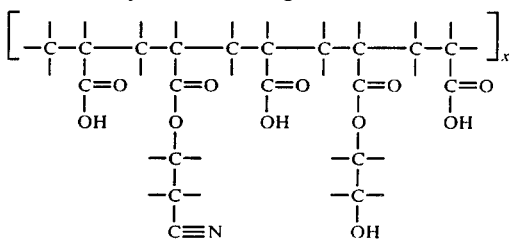

wherein x is $\geq 1$ and the polymer is further reacted with a crosslinking agent.

5. The composition according to claim 4, wherein the crosslinking agent is selected from the group consisting of triisocyanates and epoxides.

6. The composition according to claim 5, wherein the crosslinking agent is 2-(3,4-expoxycyclohexyl-5,5-spiro-3,4-epoxy) cyclohexanemeta-dioxane.

* * * * *